United States Patent Office 2,847,406
Patented Aug. 12, 1958

2,847,406

CROSS LINKED COPOLYMER

Norman R. Legge, Buechel, Ky., assignor, by mesne assignments, to American Synthetic Rubber Corporation, New York, N. Y., a corporation of Delaware No Drawing. Application March 15, 1954
Serial No. 416,439

4 Claims. (Cl. 260—80.7)

This invention concerns the polymers produced by copolymerization of butadiene and styrene and more especially those copolymers produced by the polymerization of butadiene and styrene in the presence of divinyl benzene. The effects desired by use of crosslinking agents are predominantly to retain a high tensile strength while increasing the amount of crosslinking and thus improving "mill shrinkage."

A great amount of research and development work has been performed in an effort to improve the physical properties, especially tensile strength, of crosslinked copolymers of butadiene and styrene. For many normal operations, the crosslinked polymers may be used in small percentages as compounding ingredients with other rubbers and the drop in tensile strength below that normally found in the non-crosslinked rubber is not serious. When a crosslinked copolymer is used in high percentages or alone, however, the low tensile strength developed becomes a serious problem. Much development work has tended to indicate that variation in recipe or variation in reaction temperatures produces no significant increases in tensile strength of crosslinked polymers, so that the present state of the art indicates that cross linking to develop desirable properties of low shrinkage and ability to smooth out the appearance of compounds result in a loss of tensile strength. In general, the use of more styrene, that is, an increase in styrene content of the polymer, will result in an increase of tensile strength. For example, increasing the styrene content to 45% may result in an increase of approximately 15% in the tensile strength, but this does not appear to be an adequate solution. The crosslinked polymers, as mentioned before, are generally used as processing agents in calendering or shaping operations and these polymers have been found to have generally inferior properties as compared to the properties of GRS. In particular, the tensile strength of the vulcanizate is lowered by the inclusion of the crosslinked polymers, which polymers themselves have low tensile strength.

The invention therefore is directed toward an improvement in the properties, especially the tensile strength, of crosslinked polymers without corresponding depreciation of their utility as processing aids.

In accordance with the present invention, divinyl benzene is used as the essential crosslinking agent. In contrast with prior procedures this is added in increments as copolymerization proceeds. The result is a crosslinked copolymer having greatly improved tensile strength with no substantial loss of processing characteristics. Further in accordance with the invention, the butadiene and styrene are used in the proportion of 60–83% butadiene and 40–17% styrene and the divinyl benzene is used in the proportion of 0.01 to 1%. The percentages indicated are by weight. The butadiene, styrene and divinyl benzene are emulsified in an aqueous medium and the emulsifying agent may be a potassium rosin soap. All of the butadiene and styrene are added initially but the divinyl benzene is added in increments as described. The polymerizing reaction is carried out at a temperature of 35–45° F. and at a pH of said emulsion above 7.

The principles of the invention will be defined in the claims and illustrated by the following examples:

*Example 1*

Use the following formula:

| Ingredients: | Parts per 100 parts monomer |
|---|---|
| Butadiene | 71.0 |
| Styrene | 28.5 |
| Divinyl benzene | 0.5 |
| Water | 180.0 |
| Dresinate 214 | 4.0 |
| CHP | 0.35 |
| $FeSO_4 \cdot 7H_2O$ | 0.35 |
| $K_4P_2O_7$ | 0.42 |
| Sulfole | 0.15 |
| Daxad 11 | 0.15 |
| $Na_3PO_4 \cdot 12H_2O$ | 0.50 |
| Goodrite #3955 | 0.15 |
| Water | 7.30 |

The Dresinate 214, Daxad 11, and trisodium phosphate were dissolved in 180 parts of water, and the pH of this soap solution adjusted to 10.6 with 10% KOH solution. The butadiene, styrene and half the divinyl benzene were emulsified in the soap solution and the CHP, ferrous sulfate, $K_4P_2O_7$ and Sulfole were added. The emulsion is cooled to 41° F. At 46.5% conversion, the second half of the divinyl benzene is added. The reaction is allowed to run to 61% conversion, requiring about 14 hours. The polymerization reaction is stopped by the addition of an aqueous solution of sodium dimethyldithiocarbamate and the copolymer is coagulated by a sulfuric acid aqueous solution containing sodium chloride.

*Example A* (*illustrating conventional procedure*)

In this example, the formula is the same and the steps are the same except that all the divinyl benzene was added initially.

The properties of the two products, that of Example 1 (illustrating the invention) and that of Example A (illustrating conventional procedure) are shown below.

|  | Example 1 | Example A |
|---|---|---|
| Optimum tensile strength, p. s. i | 2,850 | 2,250 |
| Mill shrinkage, percent | 23.9 | 21.1 |
| Vistex value, dl./g | 0.045 | 0.030 |

Further examples of the invention are as follows. Polymerization temperature 41° F.

|  | Example 2 | Example 3 | Example 4 |
|---|---|---|---|
| Butadiene | 64.25 | 64.30 | 64.45 |
| Styrene | 35.00 | 35.00 | 35.00 |
| Divinyl benzene | [1] 0.75 | [2] 0.78 | [4] 0.68 |
| Water | 180.00 | 180.00 | 180.00 |
| Dresinate 214 | 3.0 | 3.0 | 3.0 |
| PMHP | 0.10 | 0.10 | 0.10 |
| $FeSO_4 \cdot 7H_2O$ | 0.15 | 0.15 | 0.15 |
| $K_4P_2O_7$ | 0.18 | 0.18 | 0.18 |
| Sulfole | 0.30 | [3] 0.30 | 0.30 |
| Daxad 11 | 0.15 | 0.15 | 0.15 |
| $Na_3PO_4 \cdot 12H_2O$ | 0.50 | 0.50 | 0.50 |
| Wingstop B | 0.20 | 0.20 | 0.15 |
| Water | 7.00 | 7.00 | 7.00 |
| KORR Soap | 1.00 | 0.50 |  |
| Reaction Time, hours | 15.8 | 14.2 | 28.5 |
| Conversion, percent | 72 | 73 | 72 |
| Bound Styrene, percent | 28.1 | 27.4 | 28 |
| Mill Shrinkage, percent | 28 | 25 | 34 |
| Compound Mooney, ML-4' | 132 | 163 |  |
| Tensile Strength, p. s. i | 3,150 | 3,110 | 3,480 |

In Examples 2, 3 and 4 the steps are the same as in Example 1 except that the divinyl benzene was added in increments as shown in notes 1, 2 and 4 below.

[1] Divinyl benzene (DVB) Schedule Ex. 2:

| Conversion, percent | 0 | 17 | 26 | 45 | 58 |
|---|---|---|---|---|---|
| DVB, parts added | 0.15 | 0.15 | 0.15 | 0.15 | 0.15 |

² Divinyl benzene Schedule Ex. 3: Withheld initially. From 5 to 71% conversion, added 0.78 part at rate of 0.012 part/1% conversion.

³ Sulfole Schedule Ex. 3:

| Conversion, percent | 0 | 5 | 18 | 23 | 41 | 51 | 61 |
|---|---|---|---|---|---|---|---|
| Sulfole, part | 0 | 0.20 | 0.02 | 0.02 | 0.02 | 0.02 | 0.02 |

⁴ Divinyl benzene Schedule Ex. 4:

Conversion—
At 21.5% conversion 0.32 DVB was added.
At 45% conversion 0.36 DVB was added.

The above proprietary names and abbreviations, and the corresponding chemical terms are shown in the following table:

| | |
|---|---|
| Dresinate 214 | A potassium rosin soap. |
| CHP | Cumene hydroperoxide. |
| Sulfole | Tertiary dodecyl mercaptan. |
| Daxad 11 | A polymerized sodium salt of an alkyl sulfonic acid. |
| Goodrite 3955 | A mixture of sodium dimethyldithiocarbamate and sodium polysulfide in water. |
| PMHP | Paramenthane hydroperoxide. |
| Wingstop B | Sodium dimethyldithiocarbamate in aqueous solution. |
| DVB | Divinyl benzene. |
| KORR Soap | A potassium soap. Office of Rubber Reserve formula. |

In the examples, the quantities given are in parts by weight, base on 100% purity.

What is claimed is:

1. In the batch emulsion polymerization process for producing synthetic rubber by copolymerization of butadiene and styrene in the proportions of 60% to 83% butadiene and 40% to 17% of styrene in a reaction mixture that includes divinylbenzene as a cross-linking agent, the improvement which comprises adding the divinyl benzene to the reaction mixture in two or more separate portions at substantially spaced intervals during the reaction period to improve the tensile strength of the rubber polymer.

2. In the batch emulsion polymerization process for producing synthetic rubber by copolymerization of butadiene and styrene in the proportions of 60% to 83% butadiene and 40% to 17% of styrene in a reaction mixture that includes divinylbenzene as a cross-linking agent, the improvement which comprises adding the divinylbenzene to the reaction mixture continuously at a substantially uniform rate over a major part of the reaction period.

3. In the batch emulsion polymerization process for producing synthetic rubber by copolymerization of butadiene and styrene in the proportions of 60% to 83% butadiene and 40% to 17% of styrene in a reaction mixture that includes divinylbenzene as a cross-linking agent, the improvement which comprises adding the divinylbenzene to the reaction mixture in substantially equal portions at substantially spaced intervals during the course of the raction.

4. In the batch emulsion polymerization process for producing synthetic rubber by copolymerization of butadiene and styrene in the proportions of 60% to 83% butadiene and 40% to 17% of styrene in a reaction mixture that includes divinylbenzene as a crosslinking agent, the improvement which comprises adding the divinylbenzene to the reaction mixture in two approximately equal portions at times corresponding to about 20% and 45% conversion of the reactants to the copolymer.

References Cited in the file of this patent

UNITED STATES PATENTS

| 2,474,807 | Schoene | July 5, 1949 |
| 2,684,356 | Arundale et al. | July 20, 1954 |